United States Patent
Look et al.

(10) Patent No.: US 9,706,712 B2
(45) Date of Patent: Jul. 18, 2017

(54) FORAGE HARVESTER WITH DISPLACEABLE POST-ACCELERATOR

(71) Applicant: CLAAS SELBSTFAHRENDE ERNTEMASCHINEN GMBH, Harsewinkel (DE)

(72) Inventors: Stefan Look, Warendorf (DE); Tobias Urselmans, Goch (DE)

(73) Assignee: CLAAS Saulgau GmbH, Saulgau (DE)

( * ) Notice: Subject to any disclaimer, the term of this patent is extended or adjusted under 35 U.S.C. 154(b) by 65 days.

(21) Appl. No.: 14/708,370

(22) Filed: May 11, 2015

(65) Prior Publication Data

US 2015/0327439 A1    Nov. 19, 2015

(30) Foreign Application Priority Data

May 13, 2014  (DE) ................ 10 2014 106 696

(51) Int. Cl.
| | |
|---|---|
| *A01D 43/00* | (2006.01) |
| *A01D 61/00* | (2006.01) |
| *A01D 65/00* | (2006.01) |
| *A01D 43/08* | (2006.01) |

(52) U.S. Cl.
CPC .......... *A01D 61/00* (2013.01); *A01D 43/086* (2013.01); *A01D 65/00* (2013.01)

(58) Field of Classification Search
CPC .... A01D 43/088; A01D 43/086; A01D 43/10; A01F 29/10
USPC .................................................. 56/153, 12.8
See application file for complete search history.

(56) References Cited

U.S. PATENT DOCUMENTS

| | | | | |
|---|---|---|---|---|
| 5,863,005 A | * | 1/1999 | Bramstedt .............. | A01D 43/10 241/101.742 |
| 6,425,232 B1 | * | 7/2002 | Desnijder ............ | A01D 43/086 241/101.763 |
| 6,539,693 B2 | * | 4/2003 | Krone .................. | A01D 43/107 56/153 |
| 6,604,352 B1 | * | 8/2003 | Tyvaert ................ | A01D 43/086 56/16.4 B |
| 6,988,352 B2 | * | 1/2006 | Van Vooren .......... | A01D 43/10 56/16.4 R |
| 7,654,068 B2 | | 2/2010 | Baaken | |

(Continued)

FOREIGN PATENT DOCUMENTS

| | | | | |
|---|---|---|---|---|
| DE | 4215696 A1 | * | 11/1993 | ............ A01D 43/10 |
| EP | 1380204 | | 1/2004 | |

(Continued)

*Primary Examiner* — Árpád Fábián-Kovács
(74) *Attorney, Agent, or Firm* — Michael J. Striker

(57) ABSTRACT

A forage harvester includes a post-accelerator disposed in an interior of the forage harvester, which post-accelerator includes a conveying fan that rotates about a rotary axle. The post-accelerator is partially enclosed by a housing that is open in sections and that extends in sections into a crop-conveyance path. An extent of the extension into the crop-conveying path is adjusted by displacing the post-accelerator relative to the housing. The forage harvester also includes a wall disposed opposite an open section. The rotary axle includes ends that are mounted in bearing supports disposed on the housing via one end to be pivotable about a pivot axle. Each of the bearing supports are connected to an actuator at a free end opposing the one end disposed on the housing.

12 Claims, 4 Drawing Sheets

(56) References Cited

U.S. PATENT DOCUMENTS

| | | | |
|---|---|---|---|
| 2007/0191179 A1* | 8/2007 | Hugenroth | A01D 69/00 477/2 |
| 2008/0234020 A1 | 9/2008 | Isfort | |
| 2009/0120202 A1* | 5/2009 | Diekhans | A01D 43/085 73/861.02 |
| 2010/0205923 A1* | 8/2010 | Depestel | A01D 43/107 56/119 |
| 2012/0180446 A1* | 7/2012 | Engel | A01D 43/107 56/14.3 |

FOREIGN PATENT DOCUMENTS

| | | |
|---|---|---|
| EP | 1961288 | 8/2008 |
| EP | 1972191 | 9/2008 |

* cited by examiner

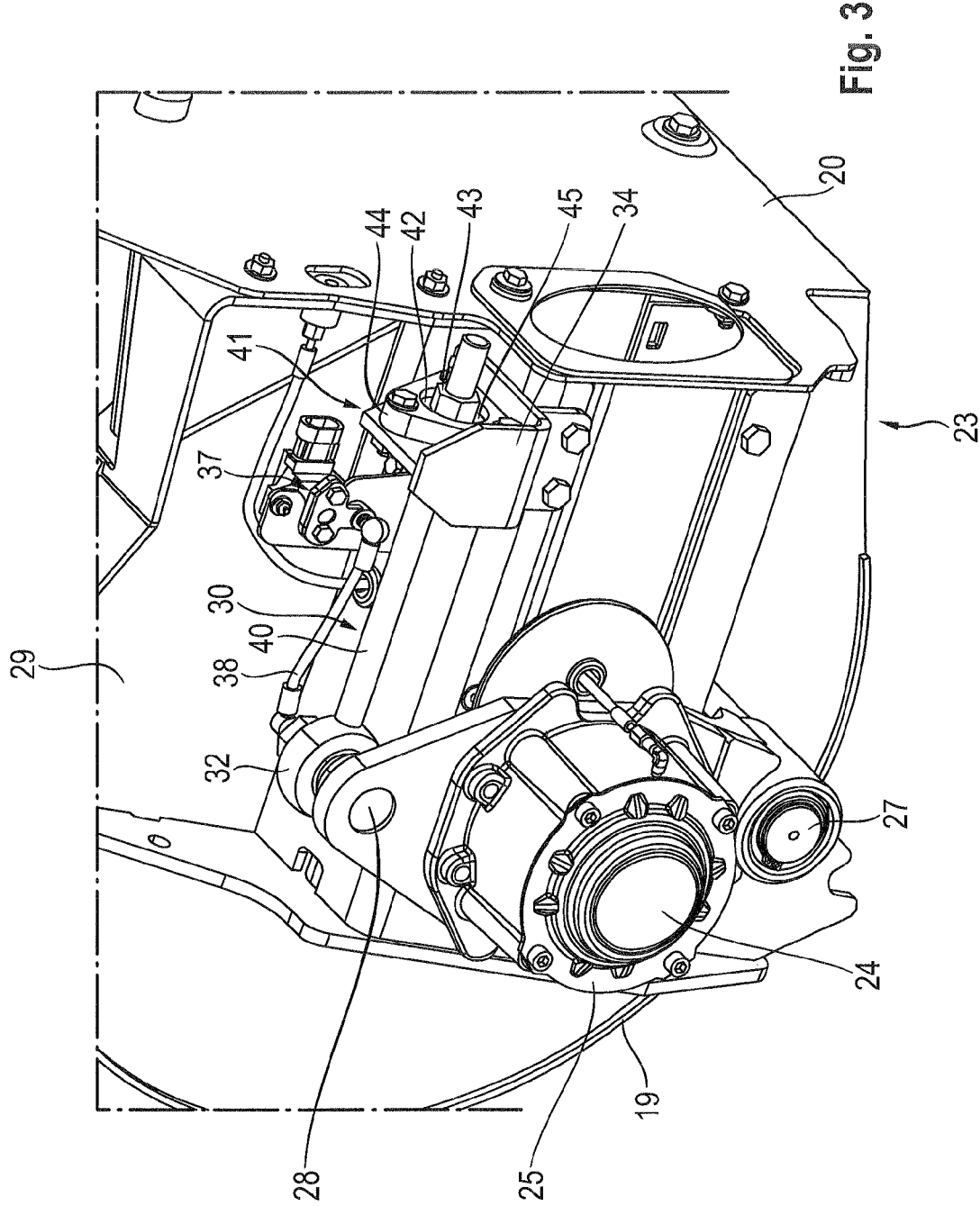

FORAGE HARVESTER WITH DISPLACEABLE POST-ACCELERATOR

CROSS-REFERENCE TO A RELATED APPLICATION

The invention described and claimed hereinbelow is also described in German Patent Application DE 10 2014 106 696.0, filed on May 13, 2014. The German Patent Application, the subject matter of which is incorporated herein by reference, provides the basis for a claim of priority of invention under 35 U.S.C. 119(a)-(d).

BACKGROUND OF THE INVENTION

The present invention relates to a forage harvester with a post-accelerator designed as a conveying fan rotating about a rotary axle and partially enclosed by a housing designed to be open in sections, where the post-accelerator adjustably extends in sections into a crop-conveyance path.

Partially enclosed post accelerators are known. EP 1 961 288 A1 describes a post-accelerator designed in the form of a conveying fan of a self-propelled forage harvester that is partially encased in a housing. The post-accelerator is driven by a pulley, which is disposed on an axle of the post-accelerator, which extends beyond the width of the housing. The post-accelerator is disposed so as to be displaceable relative to the housing. To this end, the housing is assigned a displacement mechanism, which acts on sliding devices disposed at both ends of the axle. The displacement mechanism comprises two coupling rods, each one of which acts on the respective sliding device and connects this to an eccentric shaft. The eccentric shaft is pivoted by a telescopic adjusting element, which acts on the eccentric shaft in the center. The pivoting motion of the eccentric shaft is converted into a translational motion of the sliding devices, in order to displace the post-accelerator.

The disadvantage of such a conventional device is the complex design of the displacement mechanism, which has increased play due to the plurality of connection points, making it difficult, at the least, to fine-tune the adjustment of the position.

SUMMARY OF THE INVENTION

The present invention overcomes the shortcomings of known arts, such as those mentioned above.

To that end, the present invention provides a partially enclosed post accelerator configured such that a fine-tuned and exact adjustment of the position of the post-accelerator is ensured and a method for the adjustment according thereto.

In an embodiment, the invention provides a forage harvester includes a post-accelerator disposed in an interior of said forage harvester and comprising a conveying fan that rotates about a rotary axle. The post-accelerator is partially enclosed by a housing that is open in sections and that extends in sections into a crop-conveyance path. An extent of the extension into the crop-conveying path is adjusted by displacing the post-accelerator relative to the housing. A wall is disposed opposite an open section. The rotary axle is rotatably mounted in bearing supports, which are arranged at the ends of the rotary axle and are disposed on the housing, via one end thereof, so as to be pivotable about a pivot axle and which are each connected to an actuator at the opposing, free end thereof.

This arrangement has the advantage that only two connection or engagement points are required on the housing in order to induce a movement for displacing the post-accelerator, which is supported by the bearing supports. The actuation of the actuators immediately results in a movement of the respective bearing support. A displacement that is direct and exact is achieved by reduction of the parts involved in the displacement of the post-accelerator. Preferably, the bearing supports are designed as cast parts.

The rotary axle is accommodated at each of the ends thereof in a bearing housing that is a component of the respective bearing support. The single-pieced design of the bearing support and the bearing housing as a cast part simplifies the manufacture and is a low-cost option.

In an embodiment, a respective actuator is designed as a threaded spindle held by an attaching module to be movable relative to the housing. The design of the actuator as a mechanical adjusting device is a variant that is low-cost and is implemented using a simple design. This actuator is manually actuated by an operator.

To this end, the attaching module comprises a base plate having an adjusting element disposed thereon as well as an internal thread section for accommodating the threaded rod. The base plate is clamped between a retainer plate and the bearing bracket by the retainer plate. Given that the base plate is clamped between the bearing bracket and the retainer plate, it is ensured that pressure and tensile forces applied by the conveyed crop and by the drive belt onto the post-accelerator are always absorbed. The base plate, with the adjusting element located thereon, permits a linear displacement of the post-accelerator.

According to an embodiment, the respective actuator is designed as a hydraulic lifting cylinder, permitting an automated adjustment of the post-accelerator. The two lifting cylinders are activated independently of one another. Instead of a hydraulic lifting cylinder, it also is possible to use another type of actuator, which is designed as a linear drive, e.g., an electric motor.

Advantageously, the lifting cylinders are connected to at least one pressure relief valve. The pressure relief valve is used as an overload protection unit, which responds to an overload in the crop-conveyance path caused by an excessive quantity of crop, in order to enable the post-accelerator to undergo a compensating movement by increasing the separation from the wall.

Preferably, the lifting cylinders are hydraulically coupled according to the master-slave principle. A configuration as a master-slave hydraulic cylinder pair has the advantage that a synchronous displacement of the two lifting cylinders is ensured.

In addition, an angular sensor is assigned to the respective bearing support. The advantage of this is that redundant protection is ensured. In addition, after the post-accelerator has executed a compensating movement due to an overload that occurred, the post-accelerator is returned to the previous position. is Also, a section of the housing that is open in the circumferential direction of the post-accelerator is closed by a wall disposed to be spaced apart from the post-accelerator. At least one acoustic sensor is disposed on the wall.

The invention also includes a method for adjusting a separation between a post-accelerator, which is partially enclosed by a housing designed to be open in sections, disposed in a forage harvester and arranged to extend in sections into a crop-conveyance path, and a wall, which borders an open section of the housing and is disposed to be spaced apart from the post-accelerator, and wherein the extent of the extension is adjusted by displacing the post-accelerator relative to the housing using an actuator. The method includes steps of moving the post-accelerator toward the wall, by use of the actuator, until the wall is touched by the post-accelerator; detecting the contact with the wall by an acoustic sensor disposed on the wall; and moving the post-accelerator, by the actuator, back into a position in which a defined minimum separation from the wall is assumed.

BRIEF DESCRIPTION OF THE DRAWINGS

Further features and advantages of the invention will become apparent from the description of embodiments that follows, with reference to the attached figures, wherein:

FIG. 3 depicts a partial view of a housing, which encloses a post-accelerator of the forage harvester in sections, according to one embodiment of the invention.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
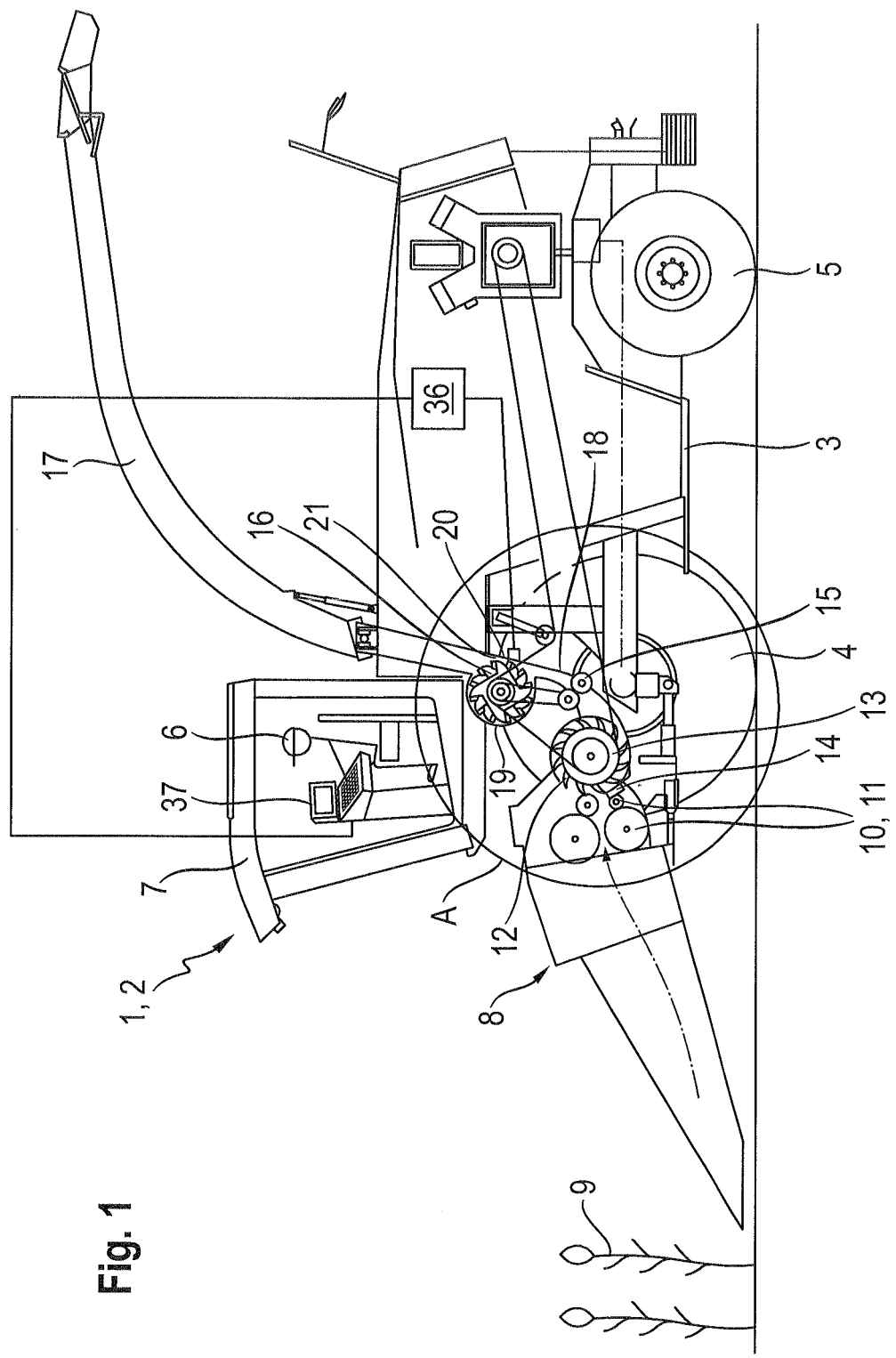
FIG. 1 depicts a side view of a self-propelled forage harvester configured according to the inventive principles.

FIG. 1 presents a side view and sectional illustration of an agricultural harvesting machine 2 designed as a self-propelled forage harvester 1. The harvesting machine 2 is built on a frame 3 that is carried by front and rear wheels 4, 5, respectively. The forage harvester 1 is operated by an operator 6 by an input/output unit 37 from within the driver's cab 7, from which it is possible to see the front attachment 8. The front attachment 8 is attached to the front of the forage harvester 1 such that in the working mode of the forage harvester 1, the front attachment picks up crop 9, cuts it and feeds it to downstream intake and compression rollers 10, 11. The intake and compression rollers 10, 11 guide the crop 9 to a downstream, rotating chopper drum 13, which equipped with blades 12 and which chops the crop 9 on a shear bar 14. The chopped crop 9 is transferred to a rechopper 15, before it is drawn into a post-accelerator 16. The task of the rechopper 15 is to pound the corn kernels, when corn is the crop being harvested. The rechopper 15 may therefore be eliminated entirely if it is not necessary to pound the crop 9, e.g., when the crop is grass. The chopped crop 9 is accelerated by the post-accelerator 16, thereby ensuring that it emerges from the transfer device 17 located downstream of the post-accelerator 16 and lands in a hauling vehicle, which is not shown.

The crop flows in the interior of the forage harvester 1 along a crop-conveyance path, which is bounded by a chute 18. Disposed above the rechopper 15 is a housing 19, which accommodates the post-accelerator 16 and is mounted on the chute 18. The housing 19 partially encloses the post-accelerator 16 in the circumferential direction and is designed so as to be open toward the chute 18, thereby allowing the post-accelerator 16 to extend into the crop-conveyance path in sections. A wall 20, which is designed as a wearing part, is disposed opposite the open section of the housing 19. This wall 20, together with the post-accelerator 16, borders a passage gap 21. The width of the passage gap 21 is adjusted by moving the post-accelerator 16 relative to the wall 20. A sensor 22 (FIG. 2A), which is preferably designed as a knock sensor, is disposed on the side of the wall 20 facing away from the post-accelerator 16. Alternatively, however, an acoustic sensor 22" may be discposed on the wall 20.

Figure 2A:
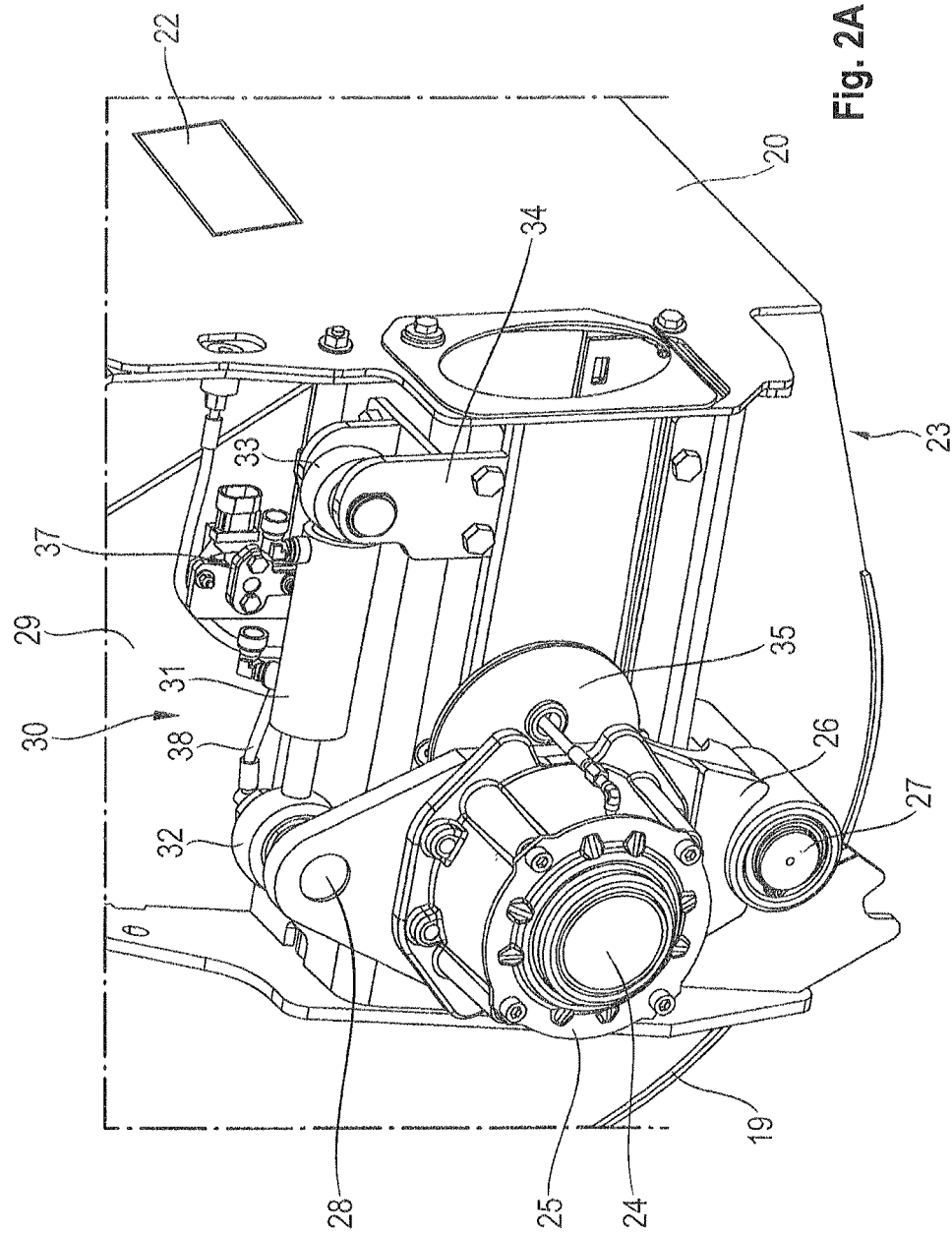
FIG. 2A depicts a partial view of a housing, which encloses a post-accelerator of the forage harvester in sections, according to one embedment of the invention.
Figure 2B:
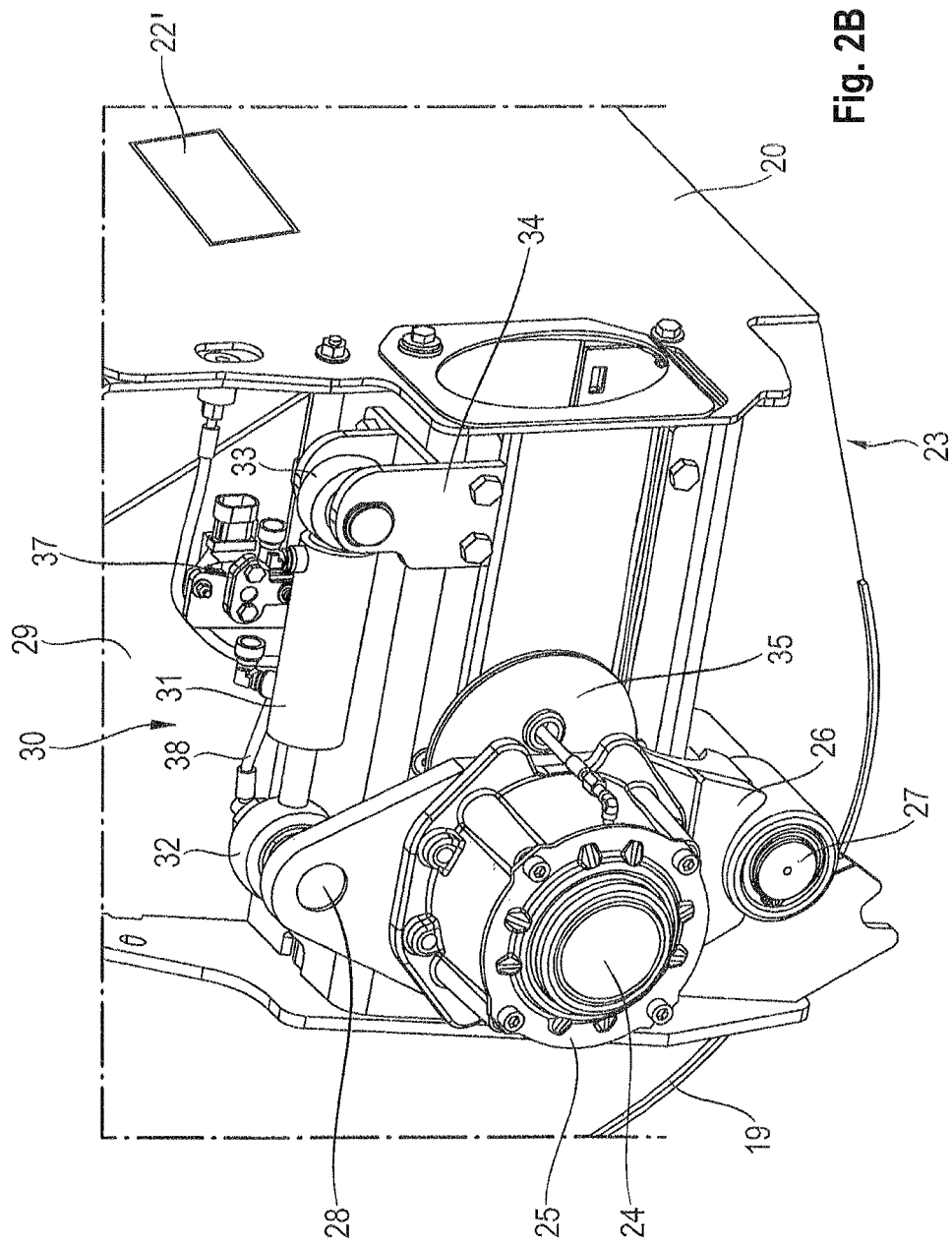
FIG. 2B depicts a partial view of a housing, which encloses a post-accelerator of the forage harvester in sections, according to variation on the embedment shown in FIG. 2A.

FIG. 2A shows a partial view of the housing 19, which encloses the post-accelerator 16. The layout of the housing 19 and the components disposed thereon is symmetrical, i.e., in particular those components described in the following, which are provided for adjusting the post-accelerator 16, are disposed on the housing 19 in a mirror-image arrangement.

FIG. 2A depicts the housing 19 having a sidewall 29 and an inlet opening 23, which is disposed adjacent to the wall 20 and through which the crop 9 fed from the rechopper 15 enters. A rotary axle 24, on which the post-accelerator 16 is rotatably mounted, extends through the housing 19. The rotary axle 24 is supported by a bearing housing 25 so as to be rotatable relative to the housing 19. The bearing housing 25 is disposed on a bearing support 26, which is preferably designed as a cast part. In an alternative embodiment, the bearing support 26 and the bearing housing 25 are designed as a single-piece cast part.

The bearing support 26 extends in the radial direction toward the rotary axle 24. The bearing support 26 is mounted via one end thereof so as to be pivotable about a pivot axle 27. The pivot axle 27 is attached to the housing 19 in a rotationally locked manner. A bolt 28, which extends in the direction of the sidewall 29 of the housing 19, is located at the opposite end of the bearing support 26. An actuator 30 acts at one end of the bearing support 26, by which the rotary axle 24 and, therewith, the post-accelerator 16 are displaced relative to the wall 20. A non-illustrated recess is provided in the respective sidewall 29, which allows the post-accelerator 16 to move relative to the housing 19. This recess is closed by a cover 35 in order to prevent material from entering or exiting through open sections of the recess.

As shown in FIG. 2A, the actuator 30 is designed as a hydraulic cylinder 31. A connecting rod eye 32 is located on the end of the connecting rod and is connected to the bolt 28 in an articulated manner. A cylinder eye 33 is located on the hydraulic cylinder 31, by which the hydraulic cylinder 31 is attached to the housing 19 by a bearing bracket 34 to be pivotable about an axle. As mentioned above, the configuration has a mirror-image design, i.e., another hydraulic cylinder 31, among other things, is located on the opposite side. This design makes it possible to activate the two hydraulic cylinders 31 independently of one another.

The hydraulic cylinders also can be hydraulically connected to one another as a master-slave hydraulic cylinder pair, however. When the connecting rods are extended, the pressure of the cylinder pair is controlled via a connecting line on the face end of the master cylinder. This master cylinder activates the slave cylinder on the face end by the outflowing hydraulic oil of the rod end, and therefore the two hydraulic cylinders 31 extend synchronously. The volume of hydraulic oil of the rod end of the master cylinder is therefore exactly matched to that of the face end of the slave cylinder. In the end positions, the volume of hydraulic oil is compensated for every time by a valve in the piston of the master cylinder, in order to ensure that the movement remains synchronous.

Due to the extension and retraction of the hydraulic cylinder 31, the bearing support 26 pivots about the pivot axle 27 in the direction of the wall 19 or away therefrom. The synchronous motion sequence of the hydraulic cylinders 31 makes it possible to set and adjust the post-accelerator 16 directly and exactly, relative to the wall 19. The enclosing circle of the post-accelerator 16 assumes a defined minimum separation from the wall 20. This minimum separation defines a width of the passage gap 21, by which the greatest possible acceleration of the crop 9 is achieved. Preferably, this minimum separation is stored as a data set in a control device 36 of the forage harvester 1, which is indicated in FIG. 1.

If the post-acceleration must be reduced due to the crop properties, the post-accelerator 16 is moved away from the wall 20 by the actuator 30, which results in an enlargement of the passage gap 21. The pivoting of the post-accelerator 16 about the pivot axle 27 is detected on both sides by angular sensors 37, which are independent of one another and which are connected to the control device 36. The control device 36 evaluates the signals of the angular sensors 37 and stores the corresponding values for the width of the passage gap 21 in a memory of the control device 36. It is therefore possible to determine and call up the width of the passage gap 21 at any point in time during operation.

The respective angular sensor 37 is connected to the end of the bearing support 26 facing away from the pivot axle 27 by a coupling rod 38. The substantially linear movement, which is executed during the displacement of the post-accelerator 16, is transferred by the coupling rod 38 to the angular sensor 37, which is connected to the control device 36 via a signal line. A signal representing the movement is forwarded to the control device 36 for evaluation.

Providing a pressure relief control valve having an integrated relief valve results in the advantage that the pressure relief valve can be used in conjunction with the hydraulic cylinders 31 as overload protection. The pressure relief valve senses the hydraulic pressure that is applied by the hydraulic cylinders 31, in order to counteract the force applied by the crop 9 that is flowing past, which induces a deflection of the post-accelerator 16 away from the wall 20. If a defined threshold value for this pressure is passed, the pressure relief valve switches such that the post-accelerator 16 executes an evasive motion, which increases the separation from the wall 20. This makes it possible to prevent damage to the post-accelerator 16. As soon as the pressure at the pressure relief valve passes the threshold value once more, the post-accelerator 16 is automatically returned, by the hydraulic cylinders 31, into the originally set position thereof, which was detected by the angular sensors.

The sensor 22, which is preferably designed as a knock sensor, has the task of simplifying the adjustment of the post-accelerator 16 for an operator of the forage harvester 1 such that the minimum separation between the wall 19 and the enclosing circle of the rotating post-accelerator 16 is automatically set. The post-accelerator 16 is designed as a rotating conveying fan, which is equipped with guide vanes that extend in the radial direction and are distributed around the circumference of the conveying fan. The guide vanes are subject to increased wear due to the contact thereof with the crop, wherein this increased wear changes the minimum separation between the enclosing circle and the wall 20.

In order to permit this minimum separation to be adjusted in accordance with the wear-induced reduction in the enclosing circle, the actuator 30 designed as a hydraulic cylinder 31 is activated by the control device 36 such that the post-accelerator 16 is moved toward the wall 20 until said actuator touches this wall. The sensor 22 detects the contact of the post-accelerator 16 with the wall 19 and transmits a corresponding signal to the control device 36. The control device 36 evaluates the signal and activates the hydraulic cylinders 31 accordingly, in order to interrupt the movement in the direction of the wall 20. In a subsequent step, the control device 36 activates the hydraulic cylinders 31 such that the defined minimum separation between the wall 20 and the enclosing circle of the post-accelerator 16, which is stored in the control device 36, is set.

This process of setting the minimum separation can be carried during assembly in the process of manufacturing a forage harvester, and at any subsequent point in time during active use of the forage harvester in a harvesting operation. In the first case, the minimum separation is set precisely, with consideration for any production tolerances. The wear of the guide vanes is accounted for at a later point in time. This process can be initiated, as needed, by an operator of the forage harvester 1, for example, by a corresponding entry on an input/output unit 37, such as a touchscreen, a terminal having a keyboard, or the like, in the driver's cab of the forage harvester 1.

FIG. 3 depicts an embodiment of the actuator 30, which is used to displace the post-accelerator 16. According to the embodiment depicted in FIG. 3, the actuator 30, which is disposed on the housing 19 in a mirror-image configuration in accordance with the previously described embodiment, is designed as a threaded rod 40. The threaded rod 40 is guided in the bearing bracket 34, to which the threaded rod 40 is connected by means of an attaching module 41. The attaching module 41 comprises a base plate 42 having the shape of a circular disk, on which an adjusting element 43, which has an internal thread section, is disposed and which accommodates and guides the threaded rod 40.

The base plate 42 is attached to the bearing bracket 34 by means of a retainer plate 44. The retainer plate 44 is preferably designed as a substantially isosceles triangle and has a recess 45 in the center thereof, through which the threaded rod 40 extends, in sections. The retainer plate 44 encloses the base plate 42. The retainer plate 44 is attached by being screwed to the bearing bracket 34. The screws used to attach the retainer plate 44 to the bearing bracket 34 are loosened in order to adjust the post-accelerator 16. The position of the post-accelerator 16 is changed by actuating the adjusting element 43, i.e., by moving or rotating this relative to the threaded rod 40. It is thereby possible to achieve a linear adjustment of the post-accelerator 16 without having actuated the threaded rod 40. Given that the base plate 42 is clamped between the retainer plate 44 and the bearing bracket 34, it is possible to absorb tensile and pressure forces that act on the actuator 30 during operation of the post-accelerator 16.

LIST OF REFERENCE SIGNS 1 forage harvester
2 harvesting machine
3 frame
4 wheels
5 wheels
6 operator
7 input/output unit 8 front attachment
9 crop
10 compression roller
11 compression roller
12 knife
13 chopper drum
14 shear bar
15 rechopper
16 post-accelerator
17 transfer device
18 chute
19 housing
20 wall
21 passage gap
22 sensor
23 inlet opening
24 rotary axle
25 bearing housing
26 bearing support
27 pivot axle
28 bolt
29 sidewall
30 actuator
31 hydraulic cylinder
32 connecting rod eye
33 cylinder eye
34 bearing bracket
35 cover
36 control device
37 angular sensor
38 coupling rod
40 threaded rod
41 attaching module
42 base plate
43 adjusting element
44 retaining plate
45 recess As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A forage harvester, comprising:
a post-accelerator disposed in an interior of said forage harvester and comprising a conveying fan that rotates about a rotary axle, wherein the post-accelerator is partially enclosed by a housing that is open in sections and that extends in sections into a crop-conveyance path and wherein an extent of the extension into the crop-conveying path is adjusted by displacing the post-accelerator relative to the housing; and
a wall disposed opposite one of the open sections;
wherein the rotary axle includes opposing ends that are mounted in bearing supports, which are disposed on the housing via one end to be pivotable about a pivot axle;
wherein each of the bearing supports are connected to an actuator at a free end opposing the one end disposed on the housing; and
wherein the actuator acts on at least one of the bearing supports, to pivot the at least one bearing support about the pivot axle, and thereby displace the post accelerator.

2. The forage harvester according to claim 1, wherein the bearing supports are designed as cast parts.

3. The forage harvester according to claim 2, wherein the rotary axle is accommodated at each opposing end in a bearing housing, wherein each bearing housing is a component of a respective bearing support.

4. The forage harvester according to claim 1, wherein the actuator is a threaded spindle retained by an attaching module to be movable relative to the housing.

5. The forage harvester according to claim 4, wherein the attaching module comprises a base plate with an adjusting element disposed thereon, and an internal threaded section for accommodating the threaded rod, and wherein the base plate is clamped between a retaining plate and a bearing bracket by the retaining plate.

6. The forage harvester according to claim 1, wherein the actuator is a hydraulic lifting cylinder.

7. The forage harvester according to claim 6, wherein the hydraulic lifting cylinder is connected to at least one pressure relief valve.

8. The forage harvester according to claim 6, wherein the hydraulic lifting cylinder is coupled according to master-slave principle.

9. The forage harvester according to claim 1, wherein an angular sensor is assigned to the bearing support.

10. The forage harvester according to claim 1, wherein at least one sensor is disposed on the wall.

11. The forage harvester according to claim 1, wherein the at least one sensor is a knock sensor.

12. The forage harvester according to claim 1, wherein the at least one sensor is an acoustic sensor.

* * * * *